US009327582B2

(12) United States Patent
Matsumiya et al.

(10) Patent No.: US 9,327,582 B2
(45) Date of Patent: May 3, 2016

(54) WORKING MACHINE HAVING A CONDENSER AND PROTECTION COVER

(71) Applicant: KUBOTA CORPORATION, Osaka-shi, Osaka (JP)

(72) Inventors: Daisuke Matsumiya, Sakai (JP); Kiyoshi Matsui, Sakai (JP); Shiro Watanabe, Sakai (JP); Junichi Fujiwara, Sakai (JP); Tsukasa Haraguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 330 days.

(21) Appl. No.: 13/792,574

(22) Filed: Mar. 11, 2013

(65) Prior Publication Data
US 2013/0255911 A1 Oct. 3, 2013

(30) Foreign Application Priority Data

Mar. 29, 2012 (JP) .................................. 2012-076550

(51) Int. Cl.
*B60H 1/32* (2006.01)
*B60H 1/00* (2006.01)
*E02F 9/08* (2006.01)

(52) U.S. Cl.
CPC .............. *B60H 1/32* (2013.01); *B60H 1/00378* (2013.01); *B60H 1/3227* (2013.01); *E02F 9/0858* (2013.01); *E02F 9/0891* (2013.01)

(58) Field of Classification Search
CPC .... B60H 1/32; B60H 1/3227; B60H 1/00378; E02F 9/0858; E02F 9/0891
USPC .................. 180/68.4, 68.6, 68.1, 69.2, 69.21, 180/69.24; 165/41
See application file for complete search history.

(56) References Cited

U.S. PATENT DOCUMENTS

| 4,143,732 A | * | 3/1979 | Schmude | B60K 11/08 180/68.6 |
| 4,696,361 A | * | 9/1987 | Clark | F01P 3/18 123/41.43 |
| 4,938,303 A | * | 7/1990 | Schaal | B60H 1/3227 123/41.48 |
| 4,962,825 A | * | 10/1990 | Albright | B60K 11/00 180/292 |
| 5,042,602 A | * | 8/1991 | Nakatani | E02F 9/0866 165/41 |
| 5,816,350 A | * | 10/1998 | Akira | B60H 1/3227 180/68.1 |
| 6,092,616 A | * | 7/2000 | Burris | B60K 11/04 180/68.1 |

(Continued)

FOREIGN PATENT DOCUMENTS

| CN | 1550364 A | 12/2004 |
| CN | 101280717 A | 10/2008 |

(Continued)

*Primary Examiner* — Brodie Follman
(74) *Attorney, Agent, or Firm* — Birch, Stewart, Kolasch & Birch, LLP

(57) ABSTRACT

The present invention is aimed to provide a working machine provided with: a condenser unit including a condenser of an air conditioner and a cooling fan for cooling the condenser, the condenser unit being disposed in a side of a cabin; and a protection cover covering above the condenser unit, capable of reducing propagation to an operator side of an air intake sound caused by inhalation of air in the protection cover through an air intake vent when the cooling fan causes a wind. In this working machine, each of air intake vents for taking cooling air into the protection cover is formed in an upper surface side of the protection cover and in each of wall parts oriented in a direction opposite to a direction visible from an operator in the cabin.

11 Claims, 16 Drawing Sheets

(56) References Cited

U.S. PATENT DOCUMENTS

| | | | | |
|---|---|---|---|---|
| 6,105,349 | A * | 8/2000 | Busboom | F01P 11/12 180/68.6 |
| 6,298,906 | B1 * | 10/2001 | Vize | B60K 11/04 165/122 |
| 6,408,969 | B1 * | 6/2002 | Lobert | B60K 11/08 165/41 |
| 6,435,264 | B1 * | 8/2002 | Konno | B60K 11/04 123/41.49 |
| 6,499,556 | B1 * | 12/2002 | Koyama | B62D 33/0617 180/311 |
| 6,540,036 | B1 * | 4/2003 | Sugano | E02F 3/325 180/68.1 |
| 6,589,307 | B2 * | 7/2003 | Jaramillo | B01D 46/521 123/198 E |
| 6,634,448 | B2 * | 10/2003 | Bland | B60K 11/04 123/41.01 |
| 6,871,697 | B2 * | 3/2005 | Albright | E02F 9/0883 123/41.49 |
| 7,370,718 | B2 * | 5/2008 | Witwer | F01P 7/10 180/68.1 |
| 7,401,672 | B2 * | 7/2008 | Kurtz, Jr. | B60K 11/04 180/165 |
| 7,717,218 | B2 * | 5/2010 | Matsumoto | E02F 9/163 180/291 |
| 7,753,152 | B2 * | 7/2010 | Nakae | B60K 11/04 165/122 |
| 8,104,559 | B2 * | 1/2012 | Kisse | F01P 1/02 180/68.1 |
| 8,162,087 | B2 * | 4/2012 | Kobayashi | B60K 11/08 165/149 |
| 8,528,681 | B2 * | 9/2013 | Fujiwara | E02F 9/0891 180/69.2 |
| 8,550,198 | B2 * | 10/2013 | Isaka | B60K 11/04 180/291 |
| 8,550,534 | B2 * | 10/2013 | Tsukamoto | B62D 25/10 180/69.21 |
| 8,556,014 | B2 * | 10/2013 | Smith | B60K 11/04 123/41.49 |
| 8,640,803 | B2 * | 2/2014 | Kinoshita | B62D 25/10 180/68.1 |
| 8,646,556 | B2 * | 2/2014 | Shimada | B62D 25/10 180/69.2 |
| 8,657,048 | B2 * | 2/2014 | Uetake | B62D 25/10 180/68.1 |
| 8,684,116 | B2 * | 4/2014 | Nakashima | B60K 11/08 180/68.1 |
| 8,783,398 | B2 * | 7/2014 | Wlezien | E02F 9/0891 180/68.1 |
| 8,820,450 | B2 * | 9/2014 | Naito | B60R 19/52 180/68.1 |
| 8,857,384 | B2 * | 10/2014 | Yotsuzuka | E02F 9/0866 123/41.58 |
| 8,936,127 | B2 * | 1/2015 | Kanamaru | E02F 9/0866 180/69.21 |
| 2004/0045754 | A1 * | 3/2004 | Bland | B60K 11/04 180/68.1 |
| 2006/0144350 | A1 * | 7/2006 | Nakashima | B60K 11/08 123/41.01 |
| 2007/0090650 | A1 * | 4/2007 | Komiyama | E02F 9/0866 290/40 C |
| 2009/0242296 | A1 * | 10/2009 | Goldsberry | B60K 13/02 180/68.3 |
| 2010/0219008 | A1 * | 9/2010 | Isaka | B60K 11/04 180/68.1 |
| 2011/0088637 | A1 * | 4/2011 | Hirasawa | B60K 11/04 123/41.31 |
| 2013/0068177 | A1 * | 3/2013 | Yotsuzuka | E02F 9/0866 123/41.58 |
| 2013/0216344 | A1 * | 8/2013 | Uetake | B62D 25/10 414/687 |
| 2013/0228388 | A1 * | 9/2013 | Ueda | B60K 11/04 180/68.1 |
| 2014/0166380 | A1 * | 6/2014 | Numasawa | E02F 9/0866 180/68.1 |
| 2014/0238759 | A1 * | 8/2014 | Kanamaru | E02F 9/0866 180/68.1 |

FOREIGN PATENT DOCUMENTS

| | | |
|---|---|---|
| JP | 11-254976 A | 9/1999 |
| JP | H11-310938 A | 11/1999 |
| JP | 4143704 B2 | 9/2008 |
| JP | 20-215700 A | 9/2009 |

* cited by examiner

WORKING MACHINE HAVING A CONDENSER AND PROTECTION COVER

TECHNICAL FIELD

The present invention relates to a working machine such as a back hoe provided with an air conditioner.

BACKGROUND ART

In a working machine such as a back hoe provided with an air conditioner, in the case where a condenser unit including a condenser of the air conditioner and a cooling fan for cooling the condenser is laid out in an engine room, exhaust heat generated at a time of cooling the condenser becomes a heat source of the other equipment to be cooled in the engine room and this may become disadvantageous in view of heat balance.

In order to improve the heat balance within the engine room, it may be preferable to lay out the condenser unit outside the engine room.

As a working machine provided with a condenser unit outside an engine room, there is disclosed in, for example, Japanese Patent 4143704 and Japanese Unexamined Patent Publication JP-A2009-215700.

In this working machine, there is provided with a rotating base rotatably supported about a rotating axis in a vertical direction on a travelling device, wherein a cabin for an operator to get aboard is installed in a left side of the rotating base and a condenser unit of the air conditioner is disposed in a right side of the cabin.

Further, the working machine is provided with a protection cover for covering over the condenser unit and an air intake vent is formed in the protection cover so that air for cooling the condenser is taken into the protection cover through the air intake vent by driving a cooling fan of the condenser unit.

In the working machine disclosed in Japanese Patent 4143704, an upper surface and a front surface of the protection cover are formed to be flat-plate shaped so that multiple air intake vents are formed in these upper and front surfaces. Also, in the working machine disclosed in JP-A2009-215700, a front surface of the protection cover is formed to be flat-plate shaped and a plurality of oblong air intake vents are formed both in upper and lower sides in this front surface. In each of the working machines disclosed in the patent documents, the condenser unit and the protection cover are positioned in a rear part of the right side of the cabin and the air intake vents are disposed in such a position that the air intake vents are visible from an operator sitting on a driver's seat.

SUMMARY OF INVENTION

Technical Problem

In each of the conventional working machines, although there occurs an air intake sound due to inhaling of air into the protection cover through the air intake vents at the time of causing wind by the cooling fan, since the condenser unit is disposed in the side of the cabin for an operator to get aboard and the air intake vents formed in the protection cover covering the condenser unit are provided in a position where the air intake vents are visible from an operator in the cabin, the air intake sound is propagated to the operator side and therefore there arises a problem the propagated sound becomes a noise for the operator.

Therefore, in consideration of the problem mentioned above, an essential object of the present invention is to provide a working machine including a condenser unit disposed in a side of a cabin and covered with a protection cover to reduce the air intake sound propagating to an operator side.

Solution to Problem

Technical means made by the present invention for solving the technical problems have specific features as follows.

In a first aspect of the present invention, a working machine provided with a cabin surrounding a driving seat, includes:

a condenser unit including a condenser of an air conditioner and a cooling fan for cooling the condenser, provided in a side of the cabin; and a protection cover covering above the condenser unit, wherein each of air intake vents for taking cooling air into the protection cover is formed in each of wall parts oriented in a direction opposite to a direction visible from an operator in the cabin in an upper surface side of the protection cover.

In a second aspect of the present invention, it is characterized that wavy V-shaped projections in cross-section are transversely disposed and arranged in a direction far away from the driving seat in the upper surface side of the protection cover, and each of the air intake vents is formed in each of the wall parts in a distal side from the driving seat in each of the wavy V-shaped projections.

In a third aspect of the present invention, it is characterized that the projections are formed so that a shape of the machine body in front cross-section is wavy V-shaped and disposed and arranged in a lateral direction of the machine body.

In a fourth aspect of the present invention, it is characterized that the condenser unit is provided with a unit base, an air exhaust vent being formed in a front surface side of the unit base and an air ventilation opening being formed in an upper surface side of the unit base, and the condenser is arranged above the unit base, and cooling wind caused by the cooling fan and passed through the condenser from the top to bottom thereof is rendered to flow from the air ventilation opening to the air exhaust vent to be exhausted from the air exhaust vent.

In a fifth aspect of the present invention, it is characterized that an opening and closing window is provided in a side surface in an arrangement side of the condenser unit of the cabin, and the air exhaust vent of the condenser unit is positioned in a lower side than the opening and closing window.

In a sixth aspect of the present invention, it is characterized that an arrangement space for arranging equipment and a member is provided in a side of the arrangement side of the condenser unit of the cabin and a detachable exterior cover is provided for covering over the arrangement space, wherein the unit base of the condenser unit is detachably attached onto the exterior cover, and wherein the condenser and the cooling fan are supported on the unit base.

In a seventh aspect of the present invention, it is characterized that the exterior cover for covering over the arrangement space is comprised of a front exterior cover to which the unit base is attached and a rear exterior cover in a rear side of the condenser unit and the protection cover is attached to a side of the condenser unit.

In an eighth aspect of the present invention, it is characterized that the condenser unit is provided with an attachment frame which is attached to the unit base and to which the condenser and the cooling fan are attached, and the attachment frame is provided with cover attachment part to which the front and rear of the protection cover is detachably attached.

Advantageous Effects of Invention

According to the present invention, the following effects are exerted.

According to the first aspect of the present invention, since each of air intake vents formed in the protection cover is formed in the upper surface side of the protection cover and formed in each of wall parts oriented in a direction opposite to a direction visible from an operator, an air intake sound caused by inhaling air into the protection cover through the air intake vents is insulated by the wall parts in the side of the protection cover visible from an operator so that the air intake sound propagating to the operator can be reduced.

According to the second aspect of the present invention, since the wavy V-shaped projections in cross-section are transversely disposed and arranged in a direction far away from the driving seat in the upper surface side of the protection cover so that each of the air intake vents is formed in each of the wall parts in a distal side from the driving seat in each of the wavy V-shaped projections, the opening area of the air intake vents can be secured while suppressing the height of the protection cover.

According to the third aspect of the present invention, since the projections are formed so that the shape of the machine body in front cross-section is wavy V-shaped and disposed and arranged in a lateral direction of the machine body, even though the condenser unit and the protection cover are disposed in a position opposing to the side of the driving seat, the air intake sound propagating to the operator can be reduced well.

According to the fourth aspect of the present invention, since the exhaust direction of hot air passing through the condenser is defined forward, the exhaust heat passing through the condenser can be prevented from affecting the operator.

According to the fifth aspect of the present invention, since the air exhaust vent of the condenser unit is positioned in a lower side than the opening and closing window of the cabin, hot air passing through the condenser can be prevented from entering into the cabin when the opening and closing window is opened.

According to the sixth aspect of the present invention, when the exterior cover is removed to perform maintenance of equipment and members in the arrangement space in the lower side of the exterior cover, the condenser unit can be removed without removing an air conditioner hose connected to the condenser, by removing the unit base from the exterior cover.

According to the seventh aspect of the present invention, since the exterior cover for covering over the arrangement space is comprised of the front exterior cover to which the unit base is attached and the rear exterior cover in a rear side of the condenser unit and the protection cover is attached to the side of the condenser unit, the maintenance of the equipment and members in the lower side of the rear exterior cover can be performed by removing the rear exterior cover without removing the condenser unit and the protection cover.

According to the eighth aspect of the present invention, since the cover attachment part to which the front and rear of the protection cover is attached is provided in the same member, a dimension error of the attachment can be reduced.

DESCRIPTION OF EMBODIMENTS

Figure 1:
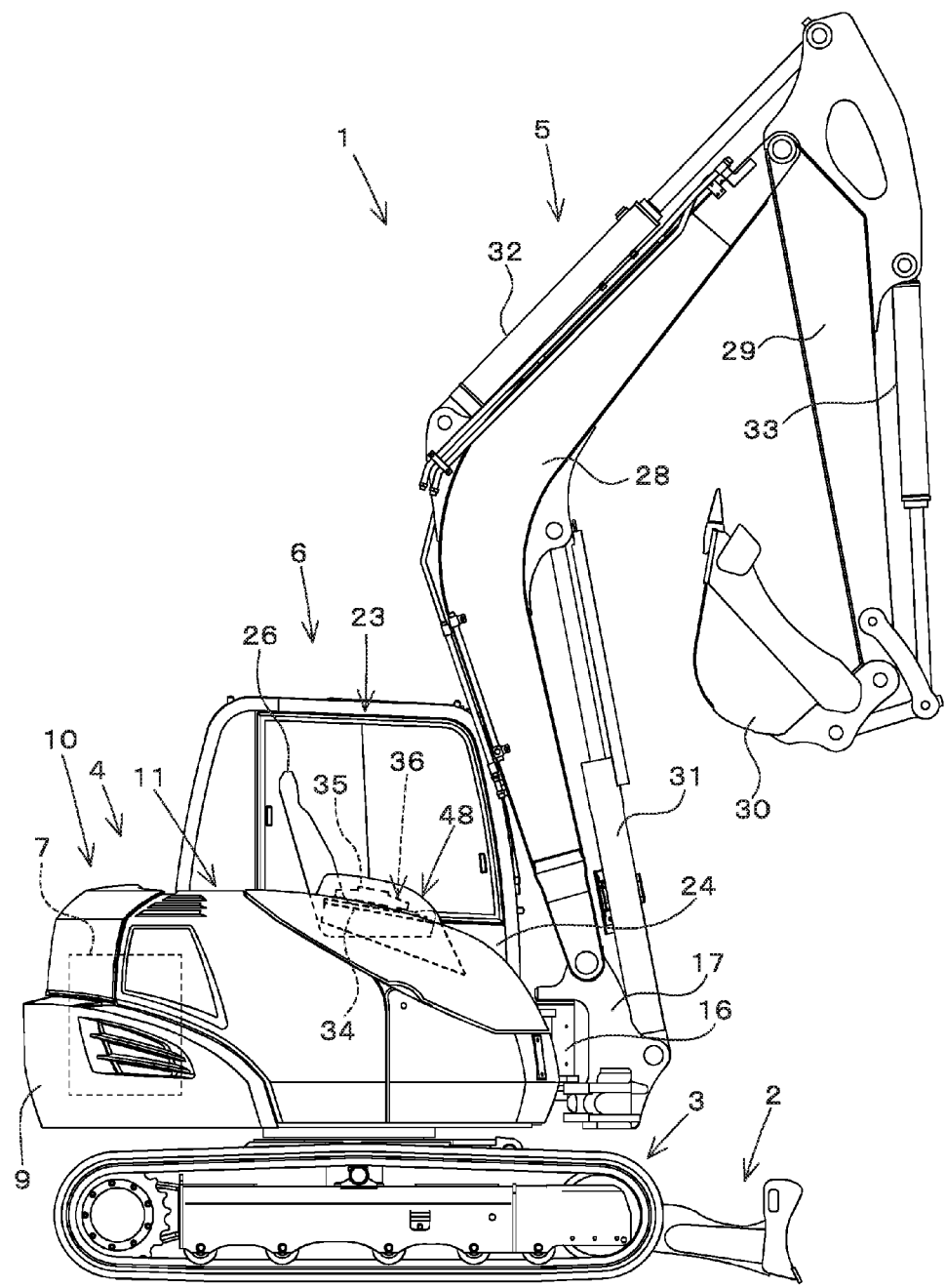
FIG. 1 is a right side view of a back hoe.

The following describes an embodiment of the present invention referring to the drawings.

In FIG. 1, reference numeral 1 denotes a back hoe exemplified as a working machine (rotational working machine).

This back hoe 1 includes a crawler type travelling device 3 provided with a dozer device 2 attached to the front portion thereof, and a rotating base 4 is supported on the travelling device 3 rotatably about a rotation axis in the vertical direction. An excavation working device 5 is provided in the front portion of the rotating base 4, and the rotating base 4 is equipped with an engine 7, a radiator (not shown), a fuel tank (not shown), an actuating oil tank (not shown), a hydraulic pump (not shown), a control valve (not shown) etc. in addition to a cabin 6 for an operator to get aboard.

In this back hoe 1, the machine body of the working machine is composed of the travelling device 3 and the rotating base 4.

Figure 4:
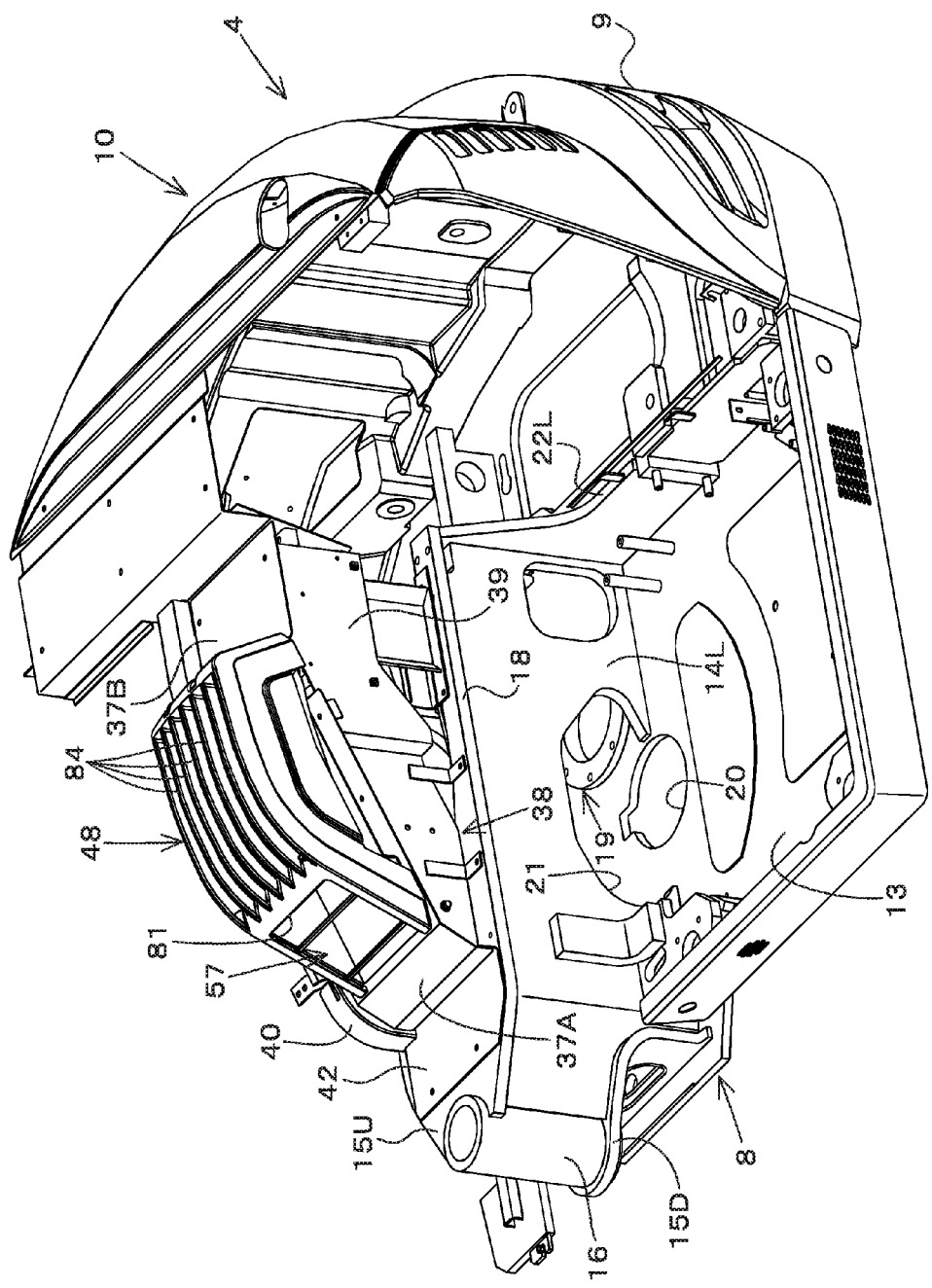
FIG. 4 is a perspective view of a rotating base when viewed from a left diagonal front position.

As shown in FIG. 4, the rotating base 4 is provided with a weight 9 which constitutes a rear part of the rotating base 4 and which is attached to a rear part of a rotating frame 8, a bonnet 10 is provided on an upper side of the rear part of the weight 9, and a side cover 11 is provided on a right side of the rotating frame 8.

Figure 5:
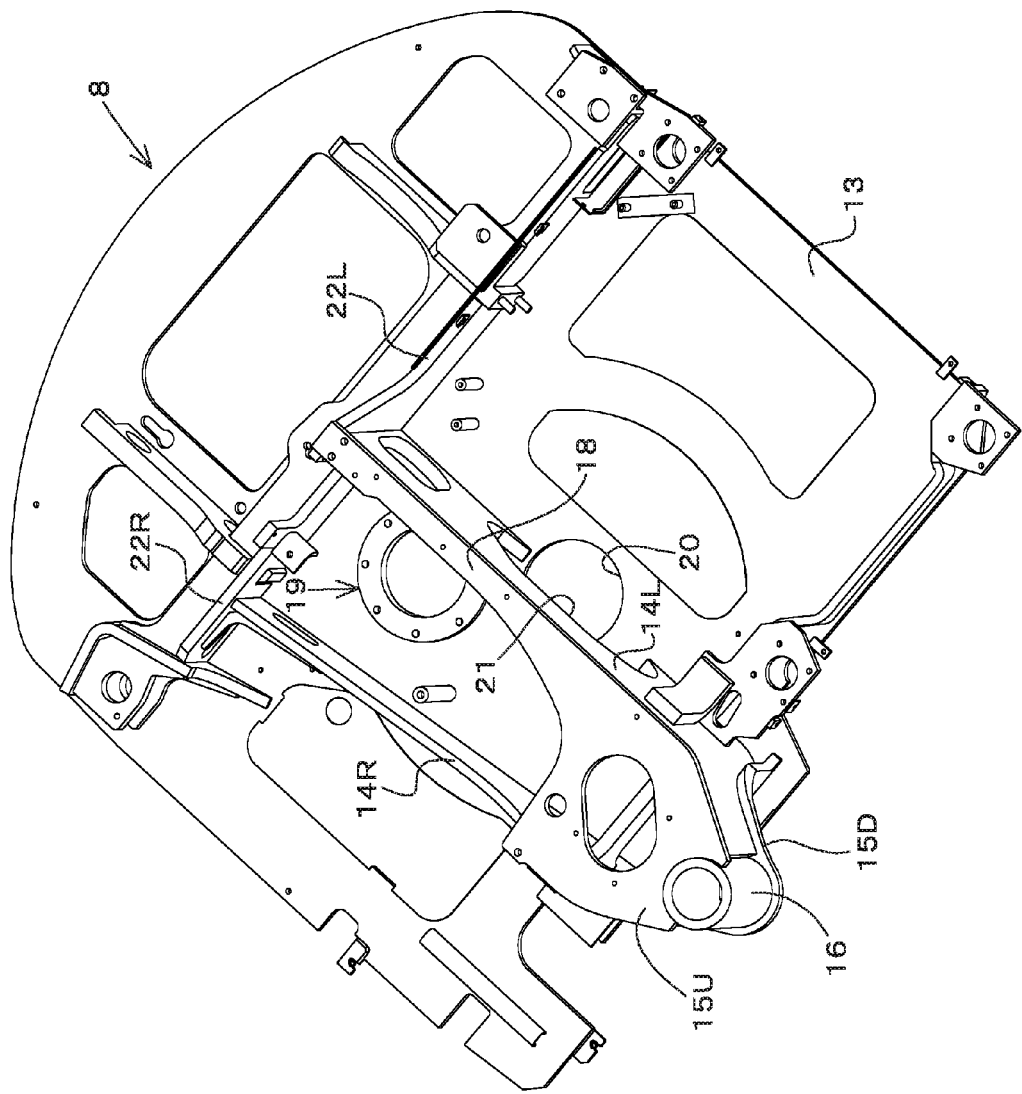
FIG. 5 is a perspective view of a rotating frame.
Figure 6:
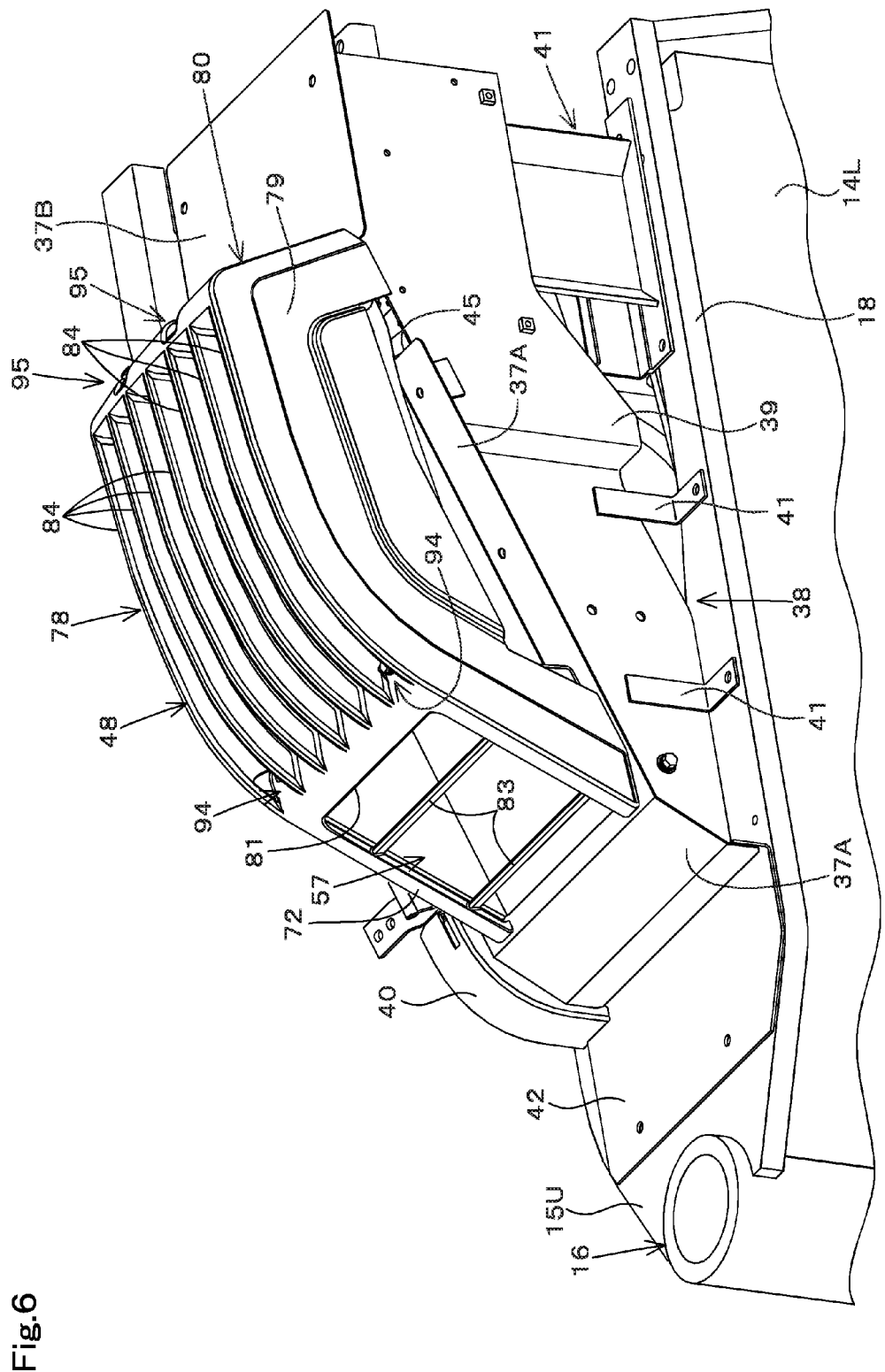
FIG. 6 is a perspective view of a condenser unit arrangement portion in a state that a protection cover is attached.
Figure 7:
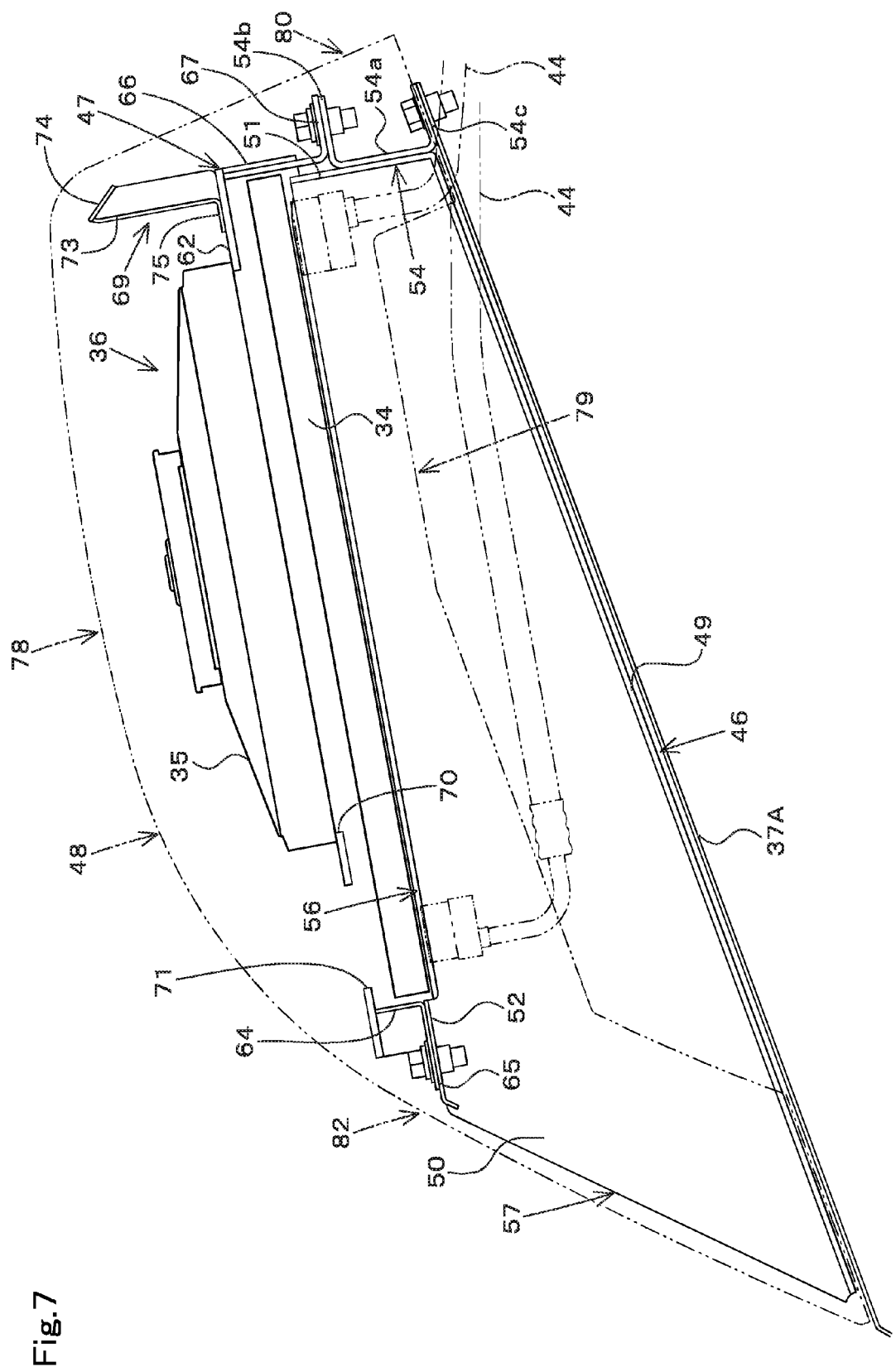
FIG. 7 is aside section view of the condenser unit.

As shown in FIGS. 4 and 5, the rotating frame 8 includes a rotating substrate 13 composed of a thick plate member which is rotatably supported on the travelling device 3 via a rotating bearing. A pair of right and left longitudinal ribs 14L and 14R each of which is composed of a plate member longitudinally disposed and extending back and forth are fixed by welding to a rightward region from a center in a lateral direction on the rotating substrate 13.

A pair of upper and lower supporting plates 15U and 15D each of which is composed of a plate member are fixed to front portions of the right and left longitudinal ribs 14L and 14R, and a supporting tube 16 is fixed to front portions of the upper and lower supporting plates 15U and 15D so that a swing bracket 17 is rotatably supported to the supporting tube 16 about a vertical axis (see FIG. 1).

A supporting wall 18 is extended backward along the left-hand longitudinal rib 14L in a left side of the upper supporting plate 15U.

In a rear part between the longitudinal ribs 14L and 14R on the rotating substrate 13, there is provided a motor attachment part 19 to which a rotating motor for rotating the rotating base 4 is attached, and a through-hole 20 for inserting a swivel joint is formed in a rotational center of the rotating substrate 13, and an insertion hole 21 for passing through such as a hydraulic hose is formed in the left longitudinal rib 14L crossing the through-hole 20 in a back and forth direction.

There are standingly provided a pair of partitioning plates 22L and 22R which are laterally extending from the rear edges of the right and left longitudinal ribs 14L and 14R so that the partitioning plates 22L and 22R are fixed to the rear side on the rotating substrate 13.

A rear side region of the right and left partitioning plates 22L and 22R on the rotating frame 8 is defined to be an installation part of an engine 7 so that the engine 7 is installed inside the bonnet 10. Thus, the inside of the bonnet 10 is defined to be an engine room. In this engine room, the radiator and the hydraulic pump etc. are installed.

Moreover, there are installed an actuating hydraulic tank, a control valve, a fuel tank and the like in the right side of the right longitudinal rib 14R on the rotating frame 8, and these actuating hydraulic tank and the like are covered with a side cover 11.

Moreover, the left side of the left longitudinal rib 14L and the forward region of the left partitioning plate 22L on the rotating frame 8 is defined as an installation part of the cabin 6 (i.e., the cabin 6 is installed on the left side of the rotating base 4).

Figure 2:
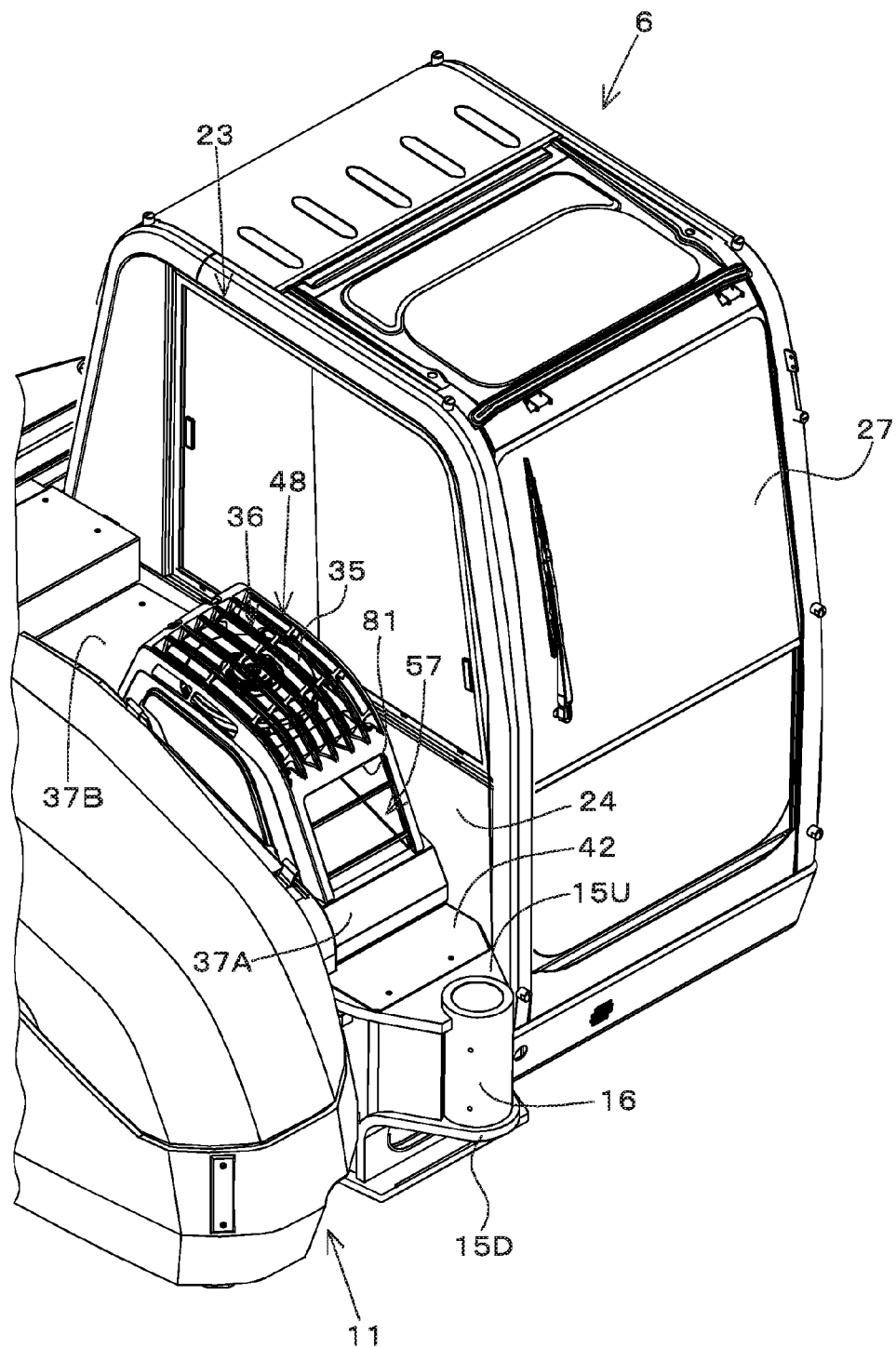
FIG. 2 is a perspective view of the back hoe when viewed from a right diagonal front position.

As shown in FIGS. 1 and 2, in the upper part of the right side surface of the cabin 6, there is provided an opening and closing window 23 composed of a double sliding window and the lower part of the right side surface of the cabin 6 is closed by a panel 24.

The cabin 6 is configured to surround a driving seat 26 and there are provided an operating device and the like in addition to the driving seat 26 in the cabin 6, a getting-on/off door in the left side surface of the cabin 6, a front glass 27 in the front surface of the cabin 6 and a rear glass in the rear surface of the cabin 6.

As shown in FIG. 1, the excavation working device 5 includes: a boom 28 of which a proximal side is pivotally supported by the swing bracket 17; an arm 29 of which proximal side is pivotally supported by a distal side of the boom 28; a bucket 30 pivotally supported by a distal side of the arm 29; a boom cylinder 31 for swinging the boom 28; an arm cylinder 32 for swinging the arm 29; and a bucket cylinder 33 for swinging the bucket 30.

The back hoe 1 is equipped with an air conditioner (air conditioning device), and a main body unit including an evaporator of the air conditioner is installed in the cabin 6, a compressor and an expansion valve of the air conditioner are installed in the engine room, and a condenser unit 36 including a condenser 34 and a cooling fan 35 of the air conditioner is installed in the side of the cabin 6 (i.e., in an exterior side of the cabin 6).

In the present embodiment, since the cabin 6 is installed in the front portion of the left side of the rotating base 4, the condenser unit 36 is installed the right side of the cabin as shown in FIGS. 1 and 2. More specifically, the condenser unit 36 is disposed between the cabin 6 and the side cover 11.

Figure 3:
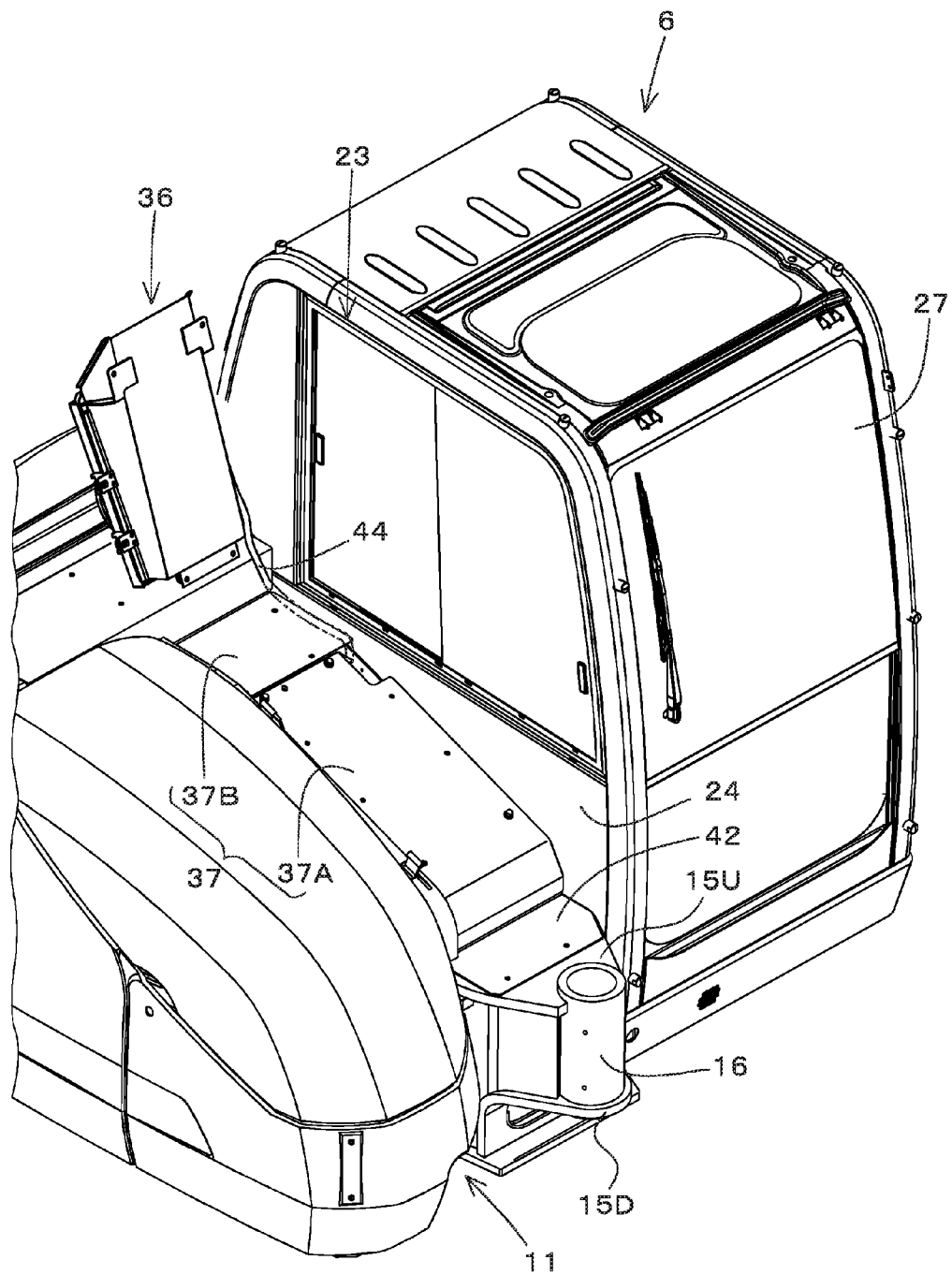
FIG. 3 is a perspective view showing a state that a condenser unit has been removed.
Figure 8:
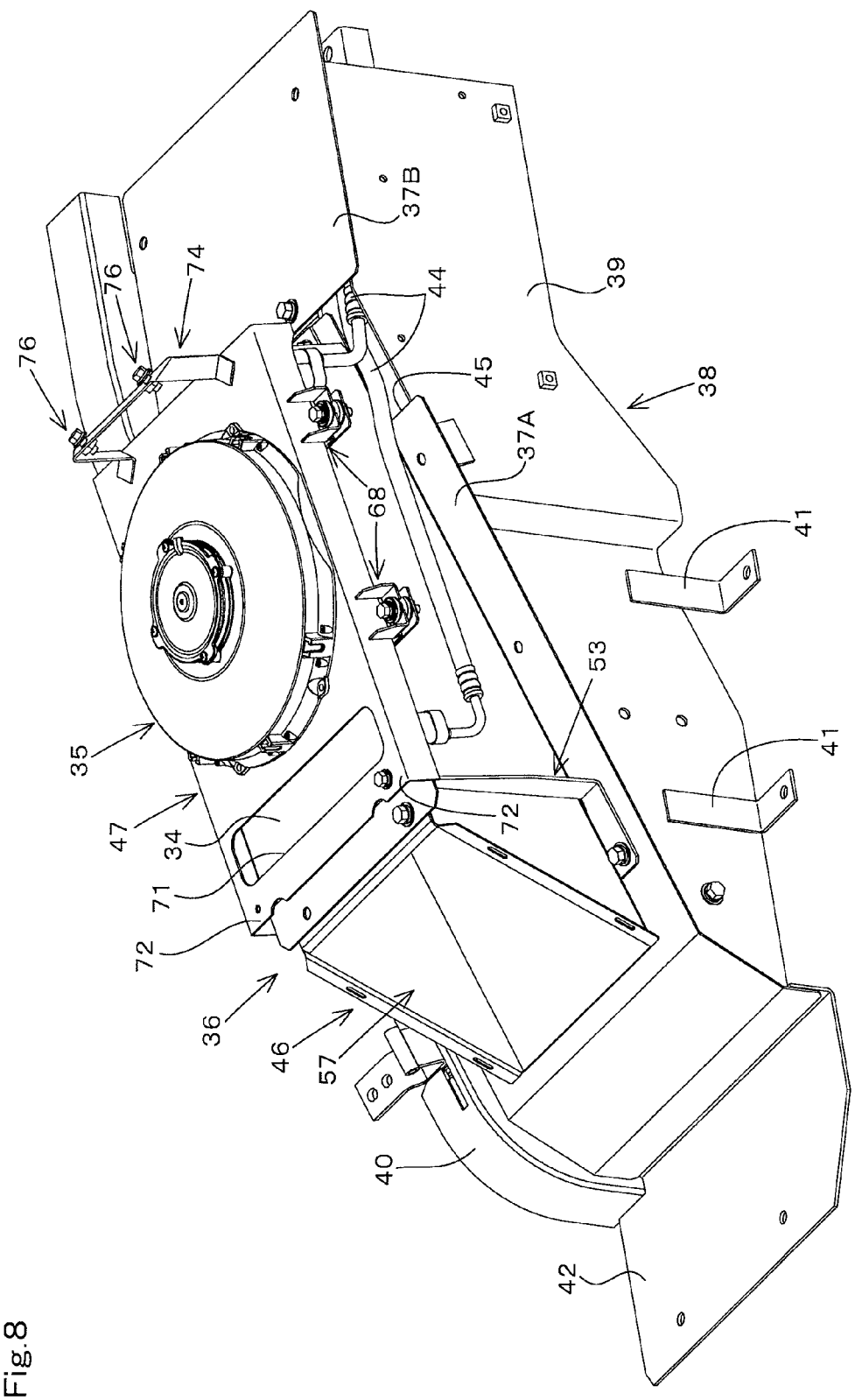
FIG. 8 is a perspective view of the condenser unit arrangement portion in a state that the protection cover is removed.

As shown in FIGS. 3 and 4, an exterior cover 37 is disposed between the lower part of the cabin 6 and the side cover 11, and this exterior cover 37 is composed of a front exterior cover 37A in the front side and a rear exterior cover 37B in the rear side so that the condenser unit 36 is attached to the front exterior cover 37A (see FIG. 8).

Each of the front and rear exterior covers 37A and 37B is formed of a flat-plate shaped plate member and the front portion of the front exterior cover 37A is bending in two steps toward the front and lower direction.

The front and rear exterior covers 37A and 37B are attached to a center frame 38 provided between the cabin 6 and the side cover 11, wherein the front exterior cover 37A is attached in a slanting state that a rear region from the front portion to the rear end thereof is lifted while the rear exterior cover 37B is attached in a substantially horizontal state.

Figure 9:
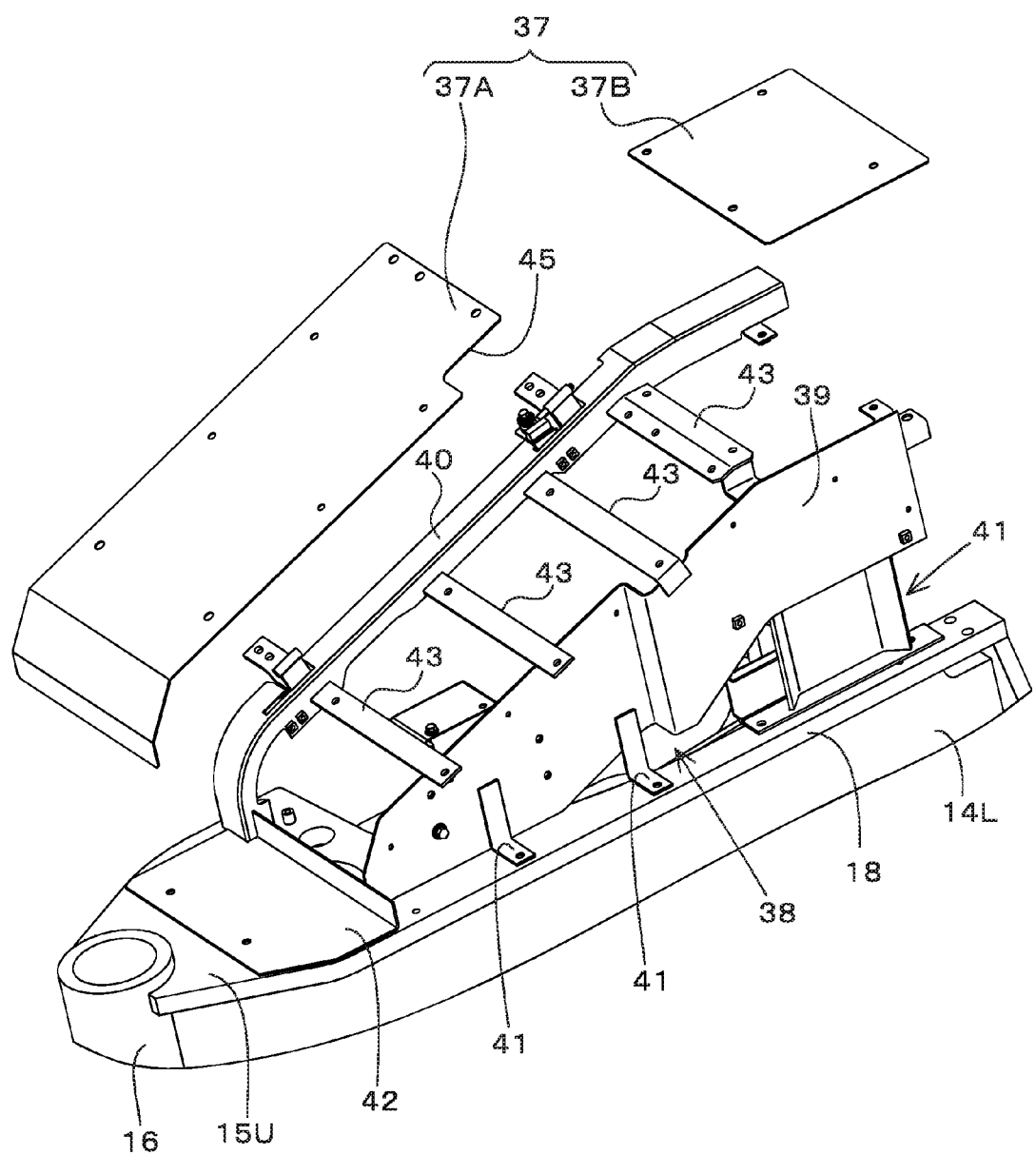
FIG. 9 is an exploded perspective view of an attachment part of an exterior cover.

As shown in FIG. 9, the center frame 38 includes a left-side frame member 39 positioned above the left longitudinal rib 14L and a right-side frame member 40 positioned above the right longitudinal rib 14R.

The left-side frame member 39 is fixed to a supporting wall 18 above the left longitudinal rib 14L via a bracket 41 and the right-side frame member 40 is fixed to a supporting plate 42 of which a front portion is bolted to the upper supporting plate 15U and a rear portion is fixed to a frame member (not shown) standingly provided on the rotating substrate 13.

Attachment plates 43 are provided between the upper end of the left-side frame member 39 and a side surface of the right-side frame member 40 with spaces in the back and forth direction, and the front and rear exterior covers 37A and 37B are detachably attached to the attachment plates 43.

The lower sides of the front and rear exterior covers 37A and 37B are defined as arrangement space for equipment, members and the like. Such equipment and members installed in the arrangement space are specifically a fuel oil pump for supplying fuel oil, a hydraulic hose, a rotating motor, a swivel joint, an accumulator for accumulating a pilot pressure and a kind of valve such as an unload valve.

Moreover, as shown in FIG. 9, an L-character shaped notch 45 (see FIG. 8) for inserting through an air conditioner hose 44 which is connected to the condenser 34, is formed in the left end side and rear end side of the front exterior cover 37A.

As shown in FIGS. 6, 7 and 8 to 13, the condenser unit 36 is mainly composed of a unit base 46 detachably attached to the front exterior cover 37A, a condenser 34 disposed in the upper part of the unit base 46, a cooling fan 35 disposed above the condenser 34 and an attachment frame 47 attaching the condenser 34 and the cooling fan 35 thereto and detachably attached to the unit base 46.

A protection cover 48 is detachably attached to the condenser unit 36, wherein the protection cover 48 covers over the condenser unit 36 (i.e., covers over the unit base 46, condenser 34, cooling fan 35 and attachment frame 47).

As shown in FIGS. 7, 10, 12 and 13 etc., the unit base 46 is mainly composed of a bottom wall 49 having a longitudinally elongated rectangular shape in plan view, right and left side walls 50 extending upward from both of the right and left edges of the bottom wall 49, a rear wall 51 extending upward from the rear edge of the bottom wall 49, a front upper wall 52 arranged in the front end sides of the upper ends of the right and left side walls 50 in a manner of crossing over the right and left side walls 50, a front bracket member 53 provided in a front outer surface side of each of the right and left side walls 50 and a rear bracket member 54 provided on the rear surface of the rear wall 51, wherein the rear side and front surface side of the front upper wall 52 on the upper surface are in an opened state.

The opening in the upper surface side of the unit base 46 is defined as an air ventilation opening 56 for ventilating exhaust air passing through the condenser 34 into the unit base 46, while the opening in the front surface side is defined as an exhaust vent 57 for exhausting the exhaust air passing through the condenser 34 to the forward of the condenser unit 36.

The exhaust vent 57 is positioned lower than the opening and closing window 23 in the upper part of the right side surface of the cabin 6.

The bottom wall 49 of the unit base 46 is arranged along the front exterior cover 37A.

The vertical width of each of the right and left side walls 50 of the unit base 46 is formed to be gradually increased in width toward the front and the front edge of each of the right and left side wall 50 is formed in a slanting state in a manner of being lowered frontward. In the front end sides of the right and left side walls 50, there are formed extending walls 58 extending toward the outside (in opposite direction to the right and left side walls 50) and a pair of upper and lower longitudinal engagement holes 59 are formed in each of the right and left extending walls 58.

The front upper wall 52 of the unit base 46 is composed of a plate member and is arranged in a manner of plate surfaces facing upward and downward to be fixed to the right and left side walls 50.

The front bracket member 53 is composed of a plate member and is formed to have an L-character shape in side view by a longitudinal wall 53a with its plate surface facing back and forth and a lower wall 53b extending forward from the lower edge of the longitudinal wall 53a. The lower wall 53b of the front bracket member 53 is bolted to the front exterior cover 37A.

The rear bracket member 54 is composed of a plate member and is formed to have a C-shaped in side view by a longitudinal wall 54a overlaid on and fixed to the lower portion of the rear surface of the rear wall 51, an upper wall 54b extending rearward from the upper edge of the longitudinal wall 54a and a lower wall 54c extending rearward from the rear edge of the longitudinal wall 54a. The lower wall 54c of the rear bracket member 54 is bolted to the front exterior cover 37A.

By detachably fixing the front and rear bracket members 53 and 54 to the front exterior cover 37A, the unit base 46 is detachably attached to the front exterior cover 37A.

Nut members for bolting the front and rear bracket members 53 and 54 are fixed to a lower surface of the attachment plates 43 for attaching and fixing the front exterior cover 37A, and the front and rear bracket members 53 and 54 are fixed to the attachment plates 43 by clamping with the front exterior cover 37A from the upper side, whereby it is configured that the unit base 46 can be detachably attached from the upper side.

The condenser 34 is made of aluminum and formed to be rectangular shaped in plan view and it is arranged in a manner of closing the air ventilation opening 56 in the upper surface of the unit base 46.

This condenser 34 is arranged to have a heat radiation surface vertically oriented so that an air flow can be ventilated into the condenser 34 in the vertical direction.

Figure 12:
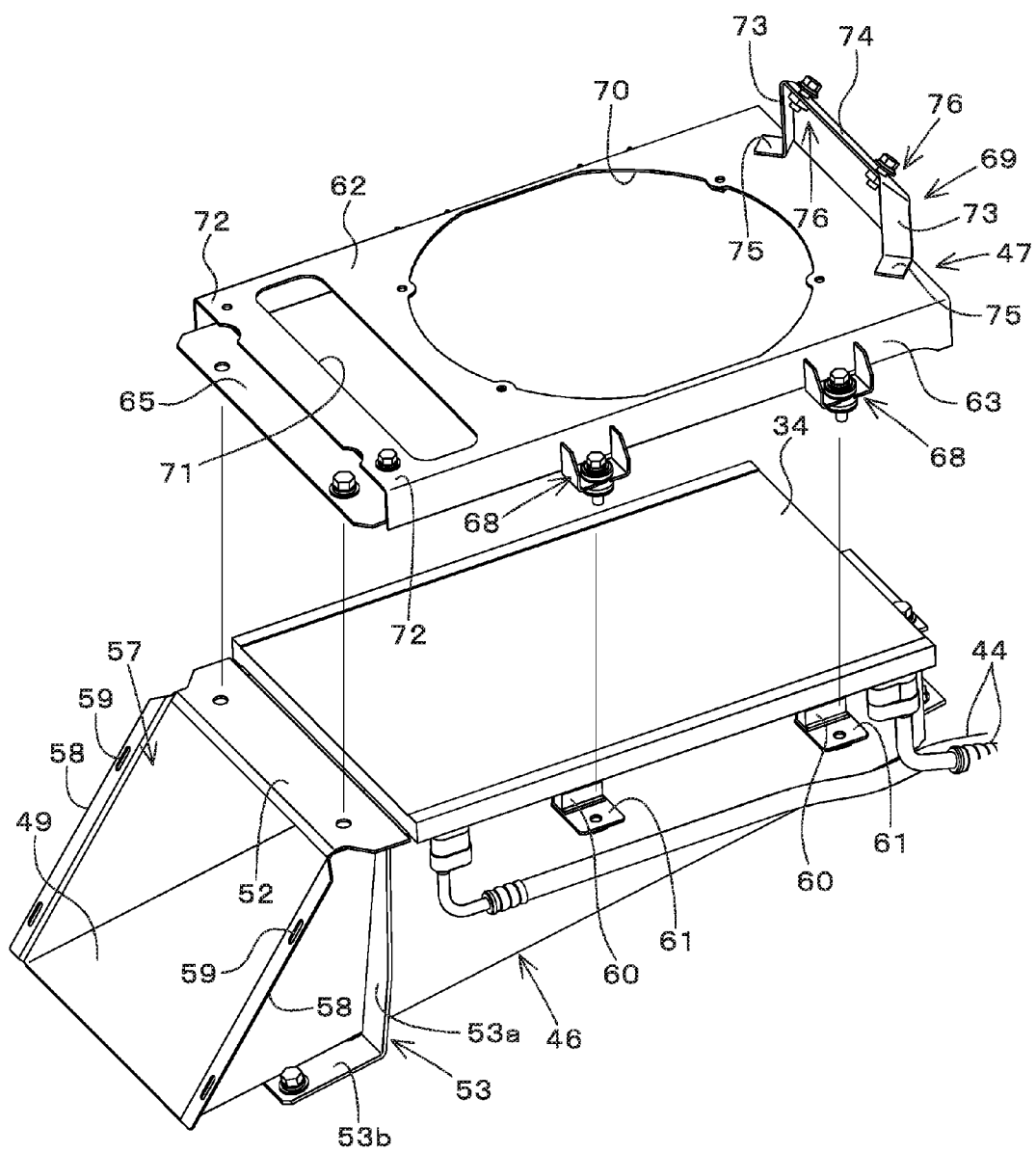
FIG. 12 is an exploded perspective view of the unit base and the attachment frame.
Figure 13:
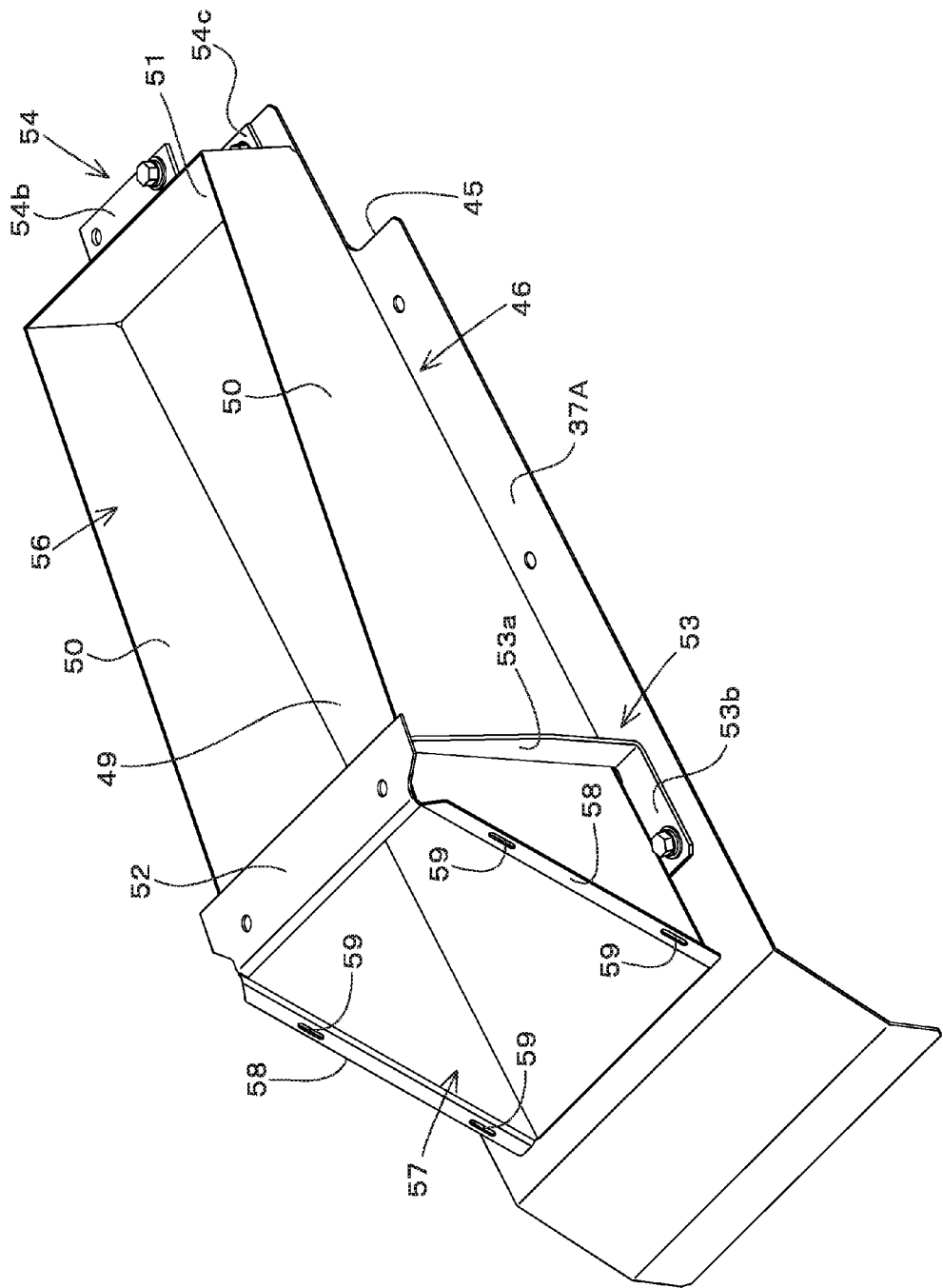
FIG. 13 is a perspective view of the unit base.

As shown in FIG. 12, a pair of front and rear attachment parts 60 are provided in the right and left both sides in the lower surface side of the condenser 34 and a stay 61 is secured to each of the attachment parts 60 in a manner of projecting in a lateral direction from the condenser 34

The cooling fan 35 is composed of an electric fan and the fan rotating about a vertical axis is accommodated in a fan case to support an electrical motor for driving the fan.

The upper surface and lower surface of the fan case of the cooling fan 35 are rendered to be air-ventilatable so that air can be ventilated from the upper side to the lower side by rotationally driving the fan.

The cooling air caused by this cooling fan 35 is blown onto the condenser 34 from the upper side to cool the condenser 34. Thus, the cooling air (exhaust air) passing through the condenser 34 is exhausted forward from the exhaust vent 57 through the inside of the unit base 46.

Figure 10:
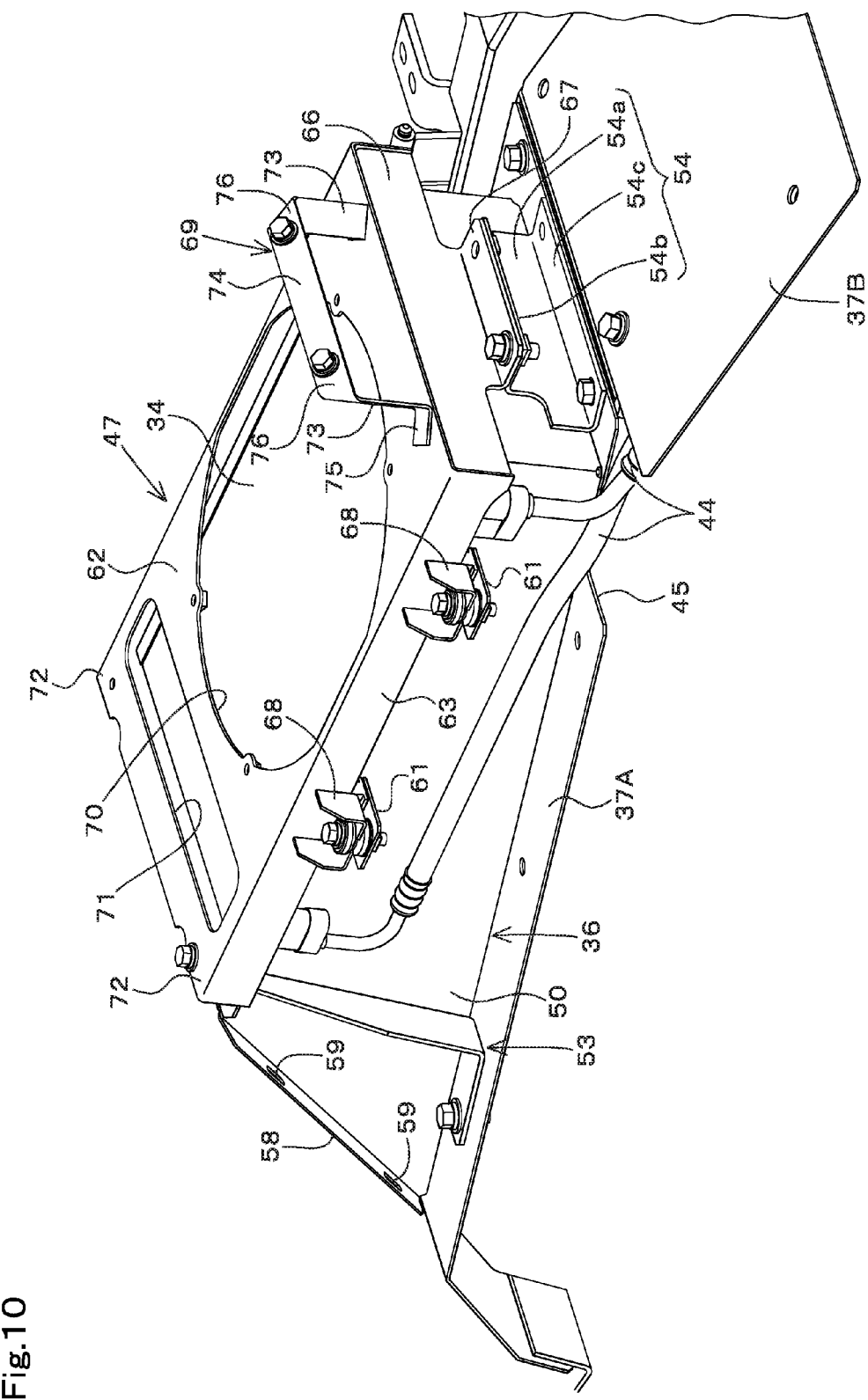
FIG. 10 is a perspective view of an assembly of a unit base and an attachment frame.
Figure 11:
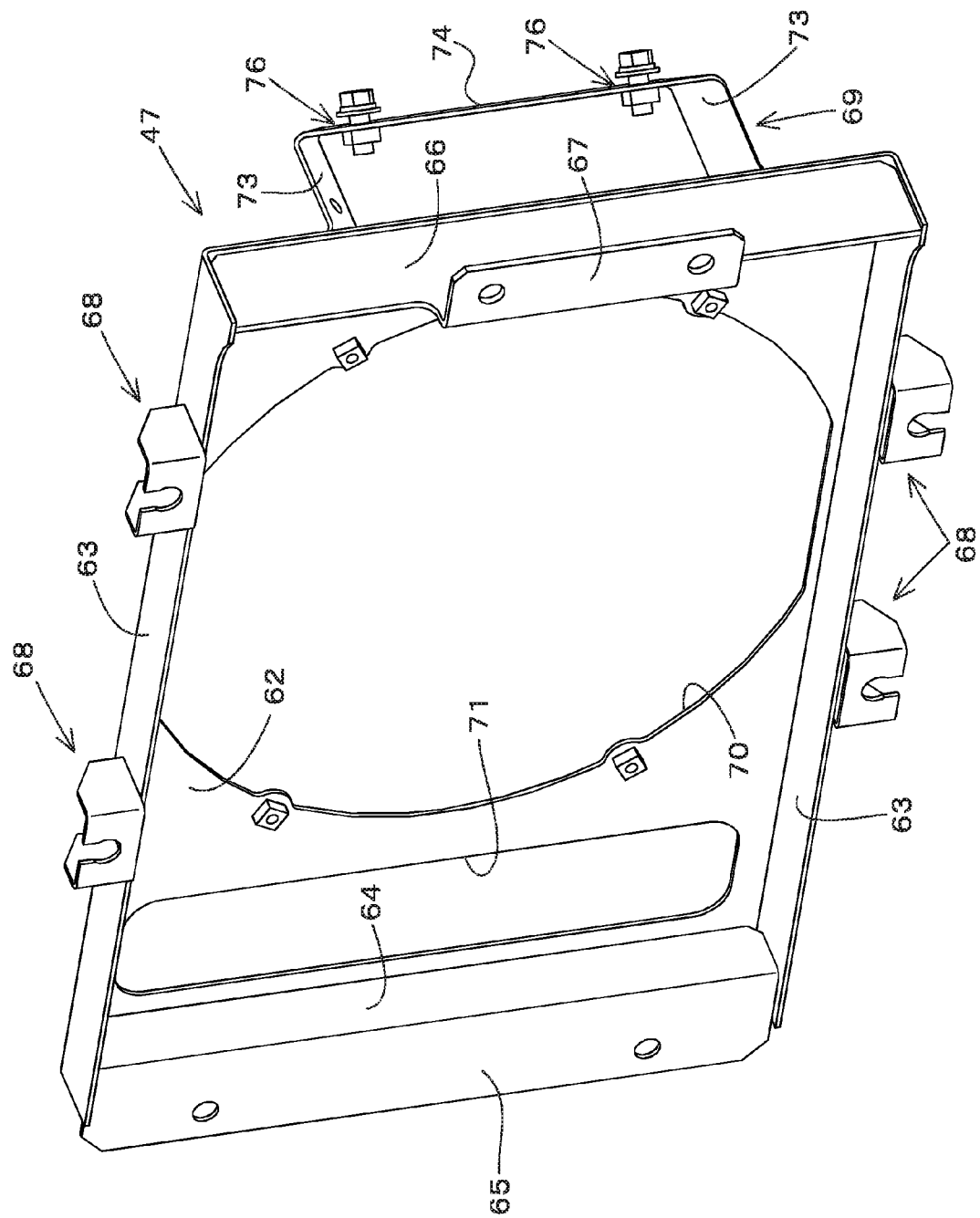
FIG. 11 is a perspective view of the attachment frame when viewed from a lower surface side.

As shown in FIGS. 10 to 12, the attachment frame 47 is mainly composed of: an upper wall 62 of a rectangular shape in plan view; right and left side walls 63 extending downward from the right and left side edges of the upper wall 62; a front wall 64 positioned in a front edge side of the lower surface of the upper wall 62; a front attachment wall 65 extending forward from the front wall 64; a rear wall 66 positioned between the rear edges of the right and left side walls 63; a rear attachment wall 67 extending backward from the center side in the lateral direction of the lower edge of the rear wall 66; a pair of front and rear condenser attachment brackets 68 fixed to an outer surface of each of the right and left side walls 63; and a protection cover attachment bracket 69 provided to stand on the rear portion of the upper wall 62.

An air blow vent 70 is formed in a center side in the back-and-forth direction of the upper wall 62 of the attachment frame 47, and a cleaning hole 71 of a rectangular shape elongated in the lateral direction is formed in the front side of the air blow vent 70 in the upper wall 62, and the protection cover attachment bracket 69 is provided to stand on and fixed to the rear side of the air blow vent 70 in the upper wall 62.

The cooling fan 35 is disposed on the upper wall 62 of the attachment frame 47 in a manner of closing the air blow vent 70 and the cooling fan 35 is bolted to upper wall 62. A nut member for bolting the cooling fan 35 is fixed to the lower surface side of the upper wall 62 of the attachment frame 47 so that the cooling fan 35 is detachably attached to the attachment frame 47 from the upper side.

The condenser 34 is disposed between the front wall 64 and the rear wall 66 in the lower side of the upper wall 62 of the attachment frame 47 so that the condenser 34 is detachably attached to the attachment frame 47 by bolting the stay 61 of the condenser 34 to the condenser attachment bracket 68 of the attachment frame 47.

A nut member for bolting the stay 61 of the condenser 34 is fixed to the lower surface side of the stay 61 so that it is configured to be able to perform the attachment of the condenser 34 from the upper side.

Moreover, a cushion member is interposed between the condenser attachment bracket 68 and the stay 61.

The cleaning hole 71 is intended to remove such as dust adhered to the condenser 34 while the condenser 34 and the cooling fan 35 are under attachment. More specifically, by blowing air toward the condenser 34 from the rear slanting upper side of the cooling fan 35 to move such as dust on the condenser 34, such as dust is collected to the lower side of the cleaning hole 71 so that such as dust can be removed from the cleaning hole 71.

The front attachment wall 65 of the attachment frame 47 is overlaid on the front upper wall 52 of the unit base 46 and both the right and left sides thereof are bolted to the front upper wall 52 while the rear attachment wall 67 of the attachment frame 47 is overlaid on the upper wall 54b of the rear bracket member 54 of the unit base 46 and both the right and left sides thereof are bolted to the upper wall 54b. Thus, the attachment frame 47 is detachably attached to the unit base 46.

Nut members for bolting the attachment frame 47 to the unit base 46 are fixed to the lower surface of the front upper wall 52 of the unit base 46 and the lower surface of the upper wall 54b of the rear bracket member 54 so that it is configured to be able to attach the attachment frame 47 to the unit base 46 from the upper side.

Both the right and left sides of the front portion side of the upper wall 62 of the attachment frame 47 are served as a cover attachment part 72 (referred to as "cover front attachment part" hereinafter) for attaching and supporting the front side of the protection cover 48. This cover front attachment part 72 is positioned in the front side of the front wall 64 and the cleaning hole 71.

The protection cover attachment bracket 69 is intended to attach and support the rear portion of the protection cover 48 and it is positioned in the rear of the air blow vent 70 and it is formed by bending a band plate member.

The protection cover attachment bracket 69 includes: right and left longitudinal wall portions 73; an attachment wall portion 74 connecting the upper edges of the right and left longitudinal wall portions 73; and a fixed wall portion 75 extended from the lower edges of each of the right and left longitudinal wall portions 73 and fixed by polymerization to the upper wall of the attachment frame 47.

Both the right and left sides of the attachment wall portion 74 are served as a cover attachment portion 76 (referred to as "cover rear attachment part" hereinafter) for attaching the rear portion of the protection cover 48, and the attachment wall portion 74 is formed in a manner that an attachment surface (plate surface) for attaching the protection cover 48 is oriented rear-diagonally upward.

The protection cover 48 is formed of a resin, and as shown in FIGS. 6, 7 and 14 to 16, it includes: an upper surface portion 78 covering over the condenser unit 36; right and left side surface portions 79 covering the condenser unit 36 from the right and left sides; a rear surface portion 80 covering the condenser unit 36 from the rear side; and a front surface portion 82 formed with an opening portion 81 corresponding to the air exhaust vent 57 of the condenser unit 36.

The lower surface of the protection cover 48 is in an opened state so that the protection cover 48 is covered over the condenser unit 36 from the upper side to be attached.

The opening portion 81 is formed in a C-shaped with its lower side opened, and side edges of the opening portion 81 are connected by a pair of upper and lower enhancement rod part 83.

The upper surface portion 78 of the protection cover 48 is formed by arranging a plurality of wavy V-shaped projections 84 in plan cross-section in a lateral direction so that the upper surface portion 78 of the protection cover 48 is formed to be uneven in a lateral direction (in other words, the upper surface side of the protection cover 48 is formed by arranging the wavy V-shaped projections 84 in plan cross-section in parallel in the direction far away from the driving seat 26).

The projections 84 are provided from the rear edge side to the front edge side of the upper surface portion 78 (i.e., from the upper edge side of the rear surface portion 80 to the upper edge side of the front surface portion 82) and are formed to be projected in a state of being elongated back and forth.

Seven projections 84 are provided in the present embodiment.

In the present embodiment, each projection 84 is formed in a V-shape composed of: one side wall part 86 which is a side wall part in a side of the cabin 6 (in a side nearer to the driving seat 26); the other side wall part 87 which is a side wall part opposite to the side of the cabin 6 (in a side farther from the driving seat 26); and a top wall part 88 connecting between the top ends of the one side wall part 86 and the other side wall part 87.

The lower edges of the one side wall part 86 and the other side wall part 87 of the projections 84 adjacent to each other in the lateral direction are connected by a bottom wall part 89.

The one side wall part 86 of the projection 84 nearest to the cabin 6 is continuous to the side surface portion 79 in the left side while the other side wall part 87 of the projection 84 farthest from the cabin 6 is continuous to the side surface portion 79 in the right side.

In the example shown in the drawings, the projections 84 are disposed in the lateral direction in such an arrangement that the heights thereof are lowered step by step as the distance from the cabin 6 increases.

An air intake vent 90 is formed in the other side wall part 87 of each of the projections 84 in order to take cooling air into the protection cover 48 for cooling the condenser 34. Therefore, by rotationally driving the cooling fan 35, air is inhaled into the protection cover 48 through the air intake vent 90 by a suction force of the cooling fan 35.

The air intake vent 90 is formed in a rectangular shape elongated back and forth, wherein two air intake vents 90 are formed in the projection 84 positioning farthest from the cabin 6, while three air intake vents 90 are formed in the back-and-forth direction in each of the other projections 84.

The other side wall part 87 of the projection 84 is oriented in an opposite direction to a direction which is visible for an operator sitting on the driving seat 26 in the cabin 6. Therefore, the air intake vent 90 is formed in a position where the air intake vent 90 is invisible for an operator.

It is noted that, although an example of all of the air intake vents 90 being formed in the other side wall parts 87 of the projections 84 is described in the present embodiment, the air intake vent may be formed in such as one side wall part 86, top wall part 88, bottom wall part 89 or the like.

Figure 15:
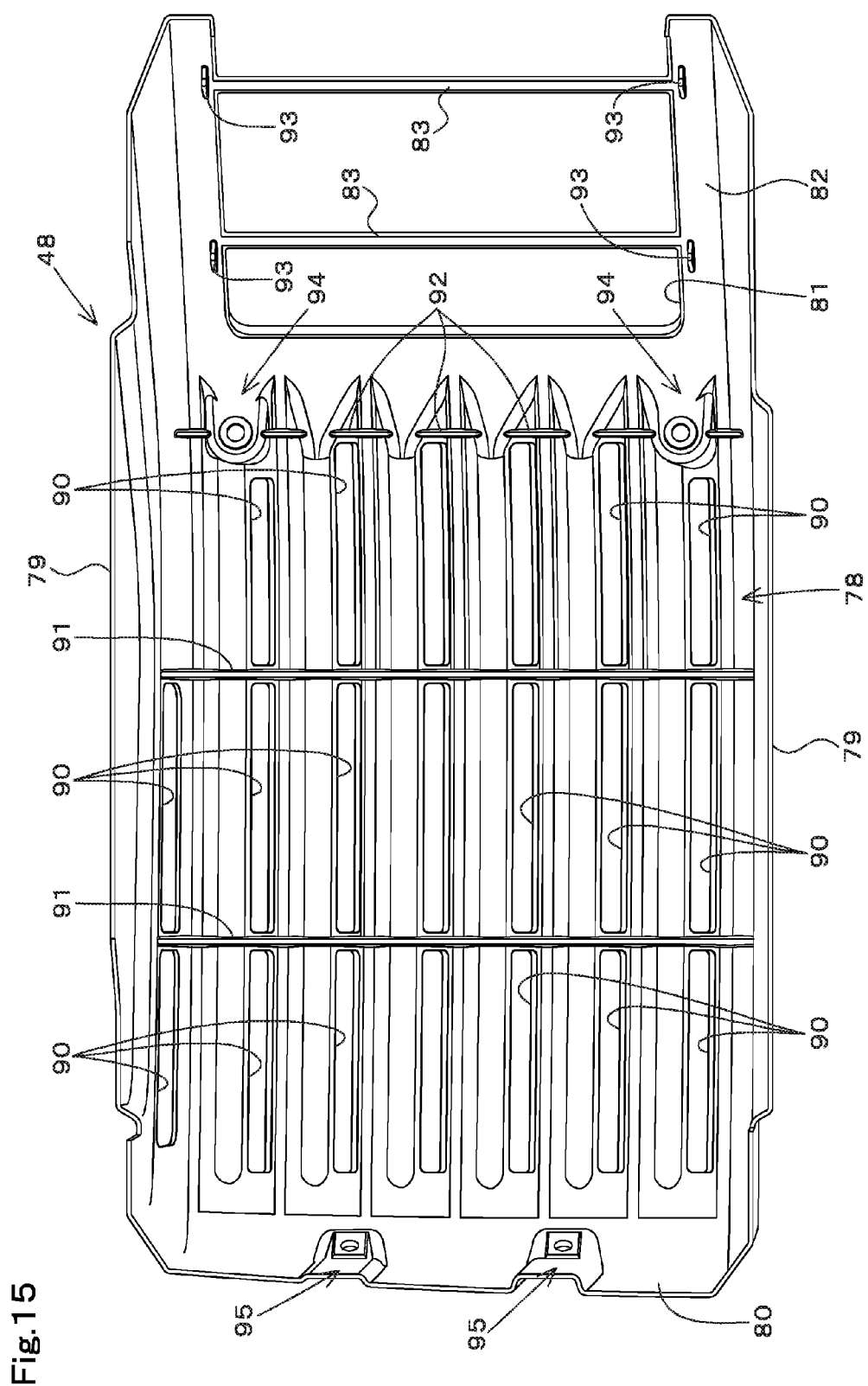
FIG. 15 is a diagram of the protection cover when viewed from the lower position.
Figure 16:
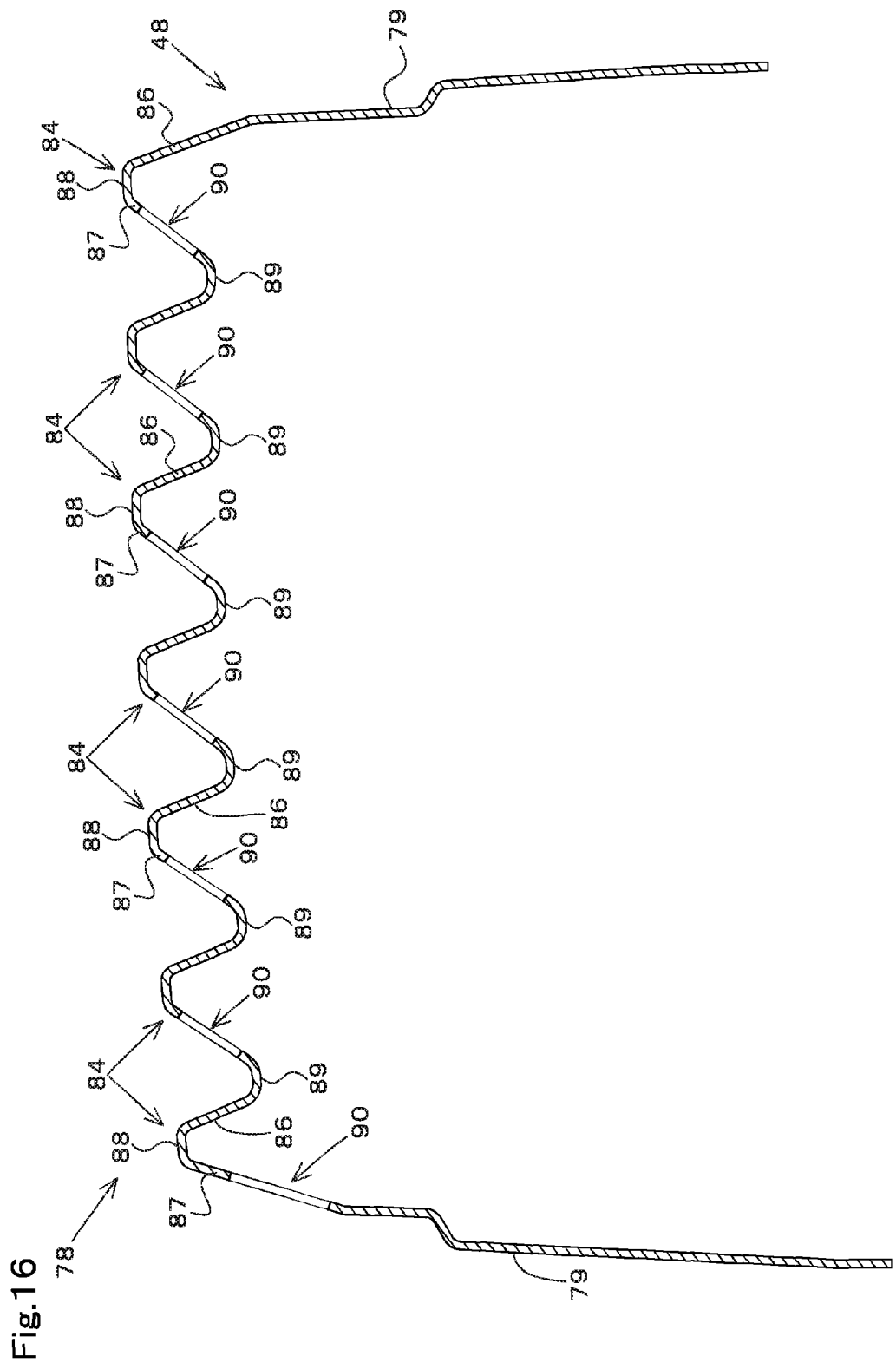
FIG. 16 is a front section view of the protection cover.

Moreover, as shown in FIG. 15, in the lower surface side of the upper surface portion 78 of the protection cover 48, there are formed a pair of back and forth continuous strengthening ribs 91 extending in the lateral direction in order for coupling the bottom wall parts 89 and also formed a discontinuous strengthening rib 92. The continuous strengthening rib 91 is formed between the air intake vents 90 adjacent in the back-and-forth direction. The discontinuous strengthening rib 92 is formed in the front side of the air intake vents 90 in the front edge side.

Moreover, in both of the right and left sides in the inner surface side of the front surface part 82 (i.e., both of the right and left sides of the opening portion 81), a pair of upper and lower engagement projections 93 are formed and each of the engagement projections 93 is inserted to an engagement hole 59 of the unit base 46 so that the positioning of the front surface part 82 of the protection cover 48 can be performed.

Figure 14:
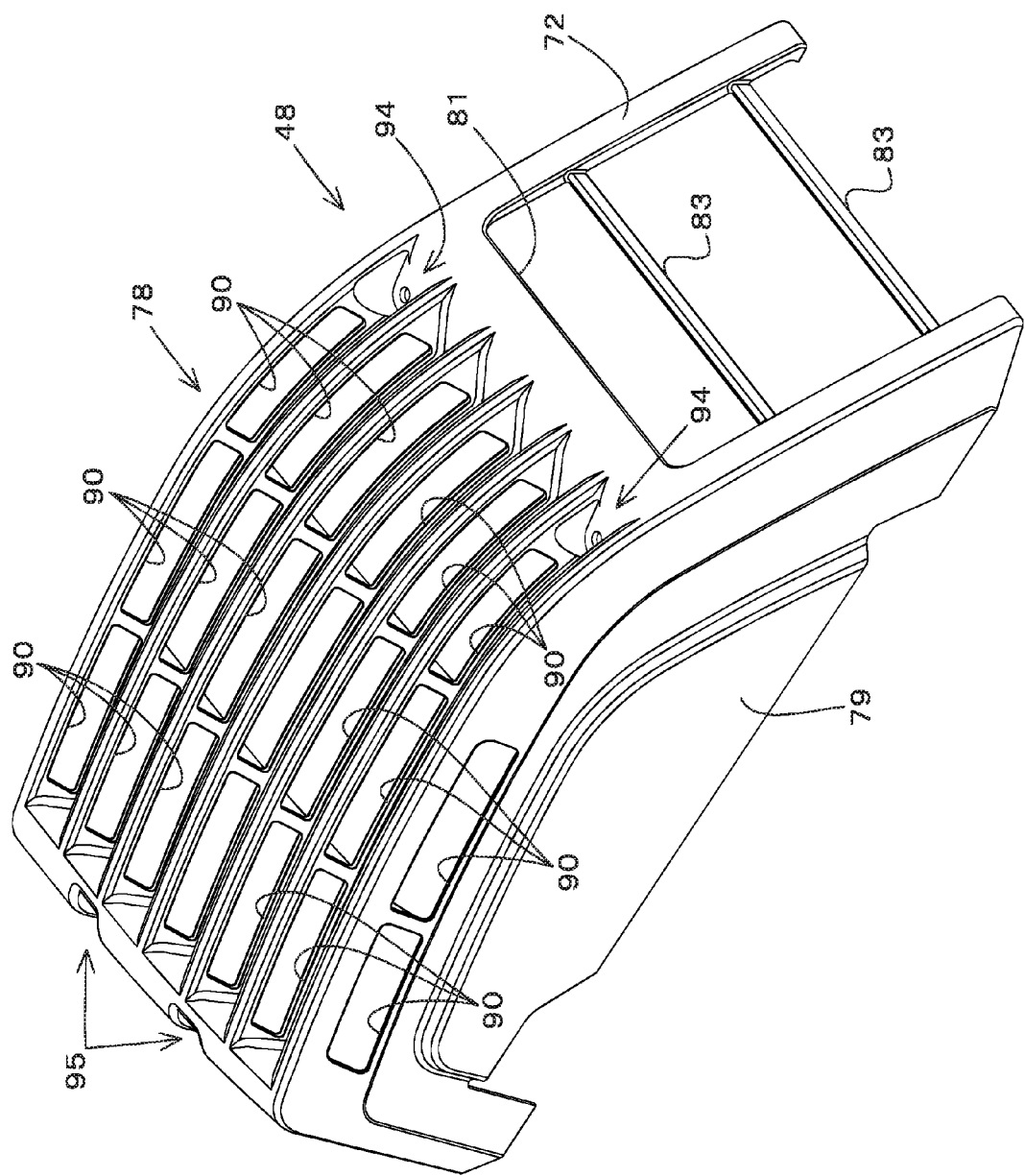
FIG. 14 is a perspective view of the protection cover.

As shown in FIG. 14, front attached parts 94 are provided both in the right and left sides in the front edge side of the upper surface part 78 and rear attached parts 95 are provided both in the right and left sides at corner portions of the upper surface part 78 and the rear surface part 80.

The front attached part 94 of the protection cover 48 is disposed on the cover attachment part 72 of the upper wall 62 of the attachment frame 47 from the upper side to be bolted, while the rear attached part 95 of the protection cover 48 is disposed on the cover rear attachment part 76 of the protection cover attachment bracket 69 from the upper side to be bolted.

Nut members for bolting the protection cover 48 to the attachment frame 47 are fixed to the lower surface of the upper wall 62 of the attachment frame 47 and the lower surface of the attachment wall part 74 of the protection cover attachment bracket 69. Thus, the protection cover 48 can be attached to the attachment frame 47 from the upper side.

In the condenser unit 36 configured as described above, the air intake vent 90 formed in the protection cover 48 is provided in the upper surface side of the protection cover 48 and in the wall part (the other wall part 87) oriented to a side opposite to a direction visible from an operator sitting on the driving seat 26. Therefore, an air intake sound caused by inhaling air into the protection cover 48 through the air intake vent 90 is insulated by a wall part (one side wall part 86 and top wall part 88) in the visible side from an operator of the protection cover 48 so that the air intake sound propagating to the operator can be reduced (i.e., the air intake sound bearable for an operator can be reduced).

Since there is an effect that the air intake sound caused by inhaling air into the protection cover 48 through the air intake vent 90 can be reduced from propagating to the operator by forming the air intake vent 90 in the wall part oriented to a side opposite to a direction visible from an operator sitting on the driving seat 26, it is not limited that the air intake vents 90 are provided in the side wall parts 87 in a side farther from the driving seat 26 (cabin 6) of the projections 84 arranged in parallel in the lateral direction as in the present embodiment, but it may be also possible that the projections 84 are disposed in a transverse direction (horizontal direction) other than the lateral direction and arranged in parallel in a direction removed away from the driving seat 26 so that each of the air intake vents 90 may be provided in the wall part of each projection 84 in a side farther from the driving seat 26.

For example, in a configuration that the condenser unit 36 and the protection cover 48 are installed in a side of the cabin 6 in the front edge side of the driving seat 26 or in the front side than the driving seat 26, it may be possible that the projections 84 are disposed and arranged in parallel in the back-and-forth direction (arranged in the direction removed forward away from the driving seat 26 in the present embodiment) so that the air intake vent 90 may be provided in the front side wall part of each of the projections 84 farther away from the driving seat 26. In this case, it is also possible that the projections 84 are formed in the direction removing away from the driving seat 26 in a diagonally forward direction (in the right-diagonally forward direction removing away from the driving seat 26) so that the air intake vent 90 may be provided in the wall part of each of the projections 84 in an opposite side to the driving seat 26 (in the wall part of the projection 84 in a side farther away from the driving seat 26).

Also, in a configuration that the condenser unit 36 and the protection cover 48 are installed in a side of the cabin 6 in the rear edge side of the driving seat 26 or in the rear side than the driving seat 26, it may be possible that the projections 84 are disposed and arranged in parallel in the back-and-forth direction (arranged in the direction removed rearward away from the driving seat 26) so that the air intake vent 90 may be provided in the rear side wall part of each of the projections 84. In this case, it is also possible that the projections 84 are formed in the direction removing away from the driving seat 26 toward a diagonally rearward direction (in the right-diagonally rearward direction removing away from the driving seat 26 in the present embodiment) so that the air intake vent 90 may be provided in the wall part of each of the projections 84 in an opposite side to the driving seat 26 (in the wall part in a side farther away from the driving seat 26).

In addition, it may be also possible that the upper surface side of the protection cover 48 is entirely formed in a wavy V-shape in cross section so that the air intake vent 90 may be provided in the wall part oriented in an opposite side to the direction visible from an operator sitting on the V-shaped driving seat 26 in this wavy V-shape.

Moreover, in the present embodiment, since the exhaust direction of hot air passing through the condenser 34 is forwarded, the exhaust heat passing through the condenser 34 can be prevented from affecting an operator.

Moreover, by forming the air intake vent 90 in the other side wall part 87 of each of a plurality of wavy V-shaped projections 84 provided in parallel in the lateral direction (in the direction removing away from the driving seat 26) in the upper surface side of the protection cover 48, the opening area of the air intake vent 90 can be secured while suppressing the height of the protection cover 48.

Moreover, by positioning the exhaust vent 57 of the condenser unit 36 in a lower side than the opening and closing window 23 of the cabin 6, hot air passing through the condenser 34 can be prevented from entering the cabin 6 when the opening and closing window 23 is opened.

Moreover, as shown in FIG. 3, by removing the protection cover 48 from the condenser unit 36 to remove the unit base 46 from the front exterior cover 37A, the condenser unit 36 can be removed without removing the air conditioner hose 44 connected to the condenser 34. In addition, by removing the condenser unit 36, maintenance of equipment and members in the arrangement space in the lower side of the front exterior cover 37A can be performed. At this time, the removed condenser unit 36 may be held in a holder member provided in such as a side surface of the cabin 6.

Moreover, since the condenser unit 36 is attached to the front exterior cover 37A and the protection cover 48 is attached to the attachment frame 47 of the condenser unit 36, the rear exterior cover 37B can be removed without removing the condenser unit 36 and the protection cover 48 so that the maintenance of such as equipment and members in the lower side of the exterior cover 37B can be performed.

Moreover, by providing the cover front attachment part 72 and the cover rear attachment part 76 for attaching the front and rear of the protection cover 48 on the same member (attachment frame 47), a dimension error in attachment can be reduced.

Moreover, since the protection cover 48 is made of resin, it never becomes high temperature due to heat by the condenser 34.

Moreover, by performing a layout of the condenser unit 36 on the front exterior cover 37A (exterior cover 37), heat from such as a hydraulic hose is never given to the condenser 34.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2012-76550 filed on Dec. 4, 2012 is hereby incorporated by reference.

The invention claimed is:

1. A working machine including a driving seat, the working machine comprising:
a machine body;
a cabin provided on one side of the machine body, the cabin being configured to surround the driving seat;
a side cover provided on another side of the machine body opposite the one side;
a condenser unit provided between the cabin and the side cover to be adjacent to the cabin, the condenser unit including:
a condenser for an air conditioner, the condenser including a heat radiation surface oriented to face upward or downward; and
a cooling fan configured to cool the condenser; and
a protection cover configured to cover an upper portion of the condenser unit, the protection cover including, on an upper surface side of the protection cover, a wall part oriented to face a direction opposite to a direction of an operator's eye from an inside of to the cabin, the wall part including an air intake vent configured to take cooling air into the protection cover.

2. The working machine according to claim 1, wherein
the protection cover includes, on the upper surface side of the protection cover, a projection including at least a wall part oriented to face a direction to the cabin side and the wall part oriented to face the direction opposite to the cabin side, the projection being formed of the wall part oriented to face to the cabin side and the wall part oriented to face to the direction opposite to the cabin side to have a reversed V-shaped cross-section, and
the wall part oriented to face the direction opposite to the cabin side includes the air intake vent.

3. The working machine according to claim 2, wherein
the protection cover includes a plurality of the projections, each of the projections having the reversed V-shaped cross-section in a front view of the machine body, and
the plurality of projections are disposed to be arranged along a lateral direction of the machine body.

4. The working machine according to claim 1, wherein
the condenser unit includes a unit base, the unit base including:
an air exhaust vent formed on a front surface side of the unit base; and
an air ventilation opening formed on an upper surface side of the unit base,
the condenser is provided above the unit base, and
the cooling fan generates cooling wind to make the cooling wind pass through the condenser from above to below, thereby supplying the cooling wind from the air ventilation opening to the air exhaust vent to exhaust the cooling wind from the air exhaust vent toward the front of the protection cover.

5. The working machine according to claim 4, wherein
the cabin includes an opening and closing window provided on a side surface of the cabin, the side surface being provided on a side where the condenser unit is disposed, and
the air exhaust vent is provided to be lower than the opening and closing window.

6. The working machine according to claim 4, further comprising:
an arrangement space for arranging equipment of the working machine, the arrangement space being provided on a side of the cabin, the side being a side where the condenser unit is provided; and
an exterior cover configured to cover the arrangement space from above, the exterior cover being detachable, wherein
the unit base is provided on the exterior cover to be attachable on and detachable from the exterior cover, the unit base supporting the condenser and the cooling fan.

7. The working machine according to claim 6, wherein
the external cover includes:
a front exterior cover configured to mount the unit base; and
a rear exterior cover provided behind the condenser unit, and
the protection cover is provided on the side where the condenser unit is disposed.

8. The working machine according to claim 4, wherein
the condenser unit includes an attachment frame configured to mount the condenser and the cooling fan, and
the attachment frame includes cover attachment parts configured to attach and detach a front portion of and a rear portion of the protection cover on and from the cover attachment parts, the cover attachment parts being disposed on the unit base.

9. The working machine according to claim 1, wherein
the protection cover includes, on an upper surface side of the protection cover, a plurality of projections, each projection being formed to be a line projecting upward, the line extending forward and backward, each projection including at least a wall part oriented to face a direction to the cabin side and the wall part oriented to face the direction opposite to the cabin side, the projection being formed of the wall part oriented to face to the cabin side and the wall part oriented to face to the direction opposite to the cabin side to have a reversed V-shaped cross-section in a front view of the machine,
the plurality of projections are disposed in parallel with each other in a lateral direction of the machine body, gradually lowering heights of peaks of the projections from the projection adjacent to the cabin toward the projection adjacent to the side cover, and
each wall part oriented to face the direction opposite to the cabin side includes the air intake vent.

10. The working machine according to claim 1, further comprising:
a traveling device;
a rotating substrate supported on the traveling device to be rotatable about a vertical axis;
a right longitudinal rib provided on the rotating substrate, the right longitudinal rib extending forward and backward;
a left longitudinal rib provided left to the right longitudinal rib on the rotating substrate, the left longitudinal rib extending forward and backward; and
an excavation working device provided in front of the right longitudinal rib and the left longitudinal rib, the excavation working device including:
a boom;
an arm; and
a bucket,
wherein
the cabin is disposed on a side adjacent to the right longitudinal rib or the left longitudinal rib, and
the condenser unit is disposed behind the excavation working device and above the right longitudinal rib and the left longitudinal rib.

11. The working machine according to claim 1, further comprising:
a traveling device;
a rotating substrate supported on the traveling device to be rotatable about a vertical axis;
a right longitudinal rib provided on the rotating substrate, the right longitudinal rib extending forward and backward; and
a left longitudinal rib provided left to the right longitudinal rib on the rotating substrate, the left longitudinal rib extending forward and backward,
wherein
the cabin is disposed on a side left of the left longitudinal rib,
the side cover is disposed on a side right to the right longitudinal rib, and
the condenser unit is disposed between the cabin and the side cover and above the right longitudinal rib and the left longitudinal rib.

* * * * *